United States Patent [19]

Gertsman et al.

[11] Patent Number: 5,140,590

[45] Date of Patent: Aug. 18, 1992

[54] TELEPHONE OR DATA SWITCHING SYSTEM WITH VARIABLE PROTOCOL INTER-OFFICE COMMUNICATION

[75] Inventors: Michael J. Gertsman, Nepean; Ross M. MacGillivray, Kanata, both of Canada

[73] Assignee: Mitel Corporation, Kanata, Canada

[21] Appl. No.: 494,668

[22] Filed: Mar. 16, 1990

[51] Int. Cl.⁵ .................................................. H04J 3/12
[52] U.S. Cl. .................................. 370/110.1; 370/79; 379/232
[58] Field of Search ............... 370/110.1, 79, 60, 94.1; 379/94, 232, 235

[56] References Cited

U.S. PATENT DOCUMENTS

| | | | |
|---|---|---|---|
| 4,623,760 | 11/1986 | Binkerd et al. | 370/110.1 |
| 4,656,624 | 4/1987 | Collins et al. | 379/94 |
| 4,882,727 | 11/1989 | Williams et al. | 370/110.1 |
| 4,903,263 | 2/1990 | Patel et al. | 370/60 |
| 4,961,186 | 10/1990 | Chandramouli et al. | 370/110.1 |

Primary Examiner—Douglas W. Olms
Assistant Examiner—Dang Ton
Attorney, Agent, or Firm—Antonelli, Terry, Stout & Kraus

[57] ABSTRACT

A method of producing interoffice signalling comprising storing program blocks for commanding generation, in a plurality of signalling protocols, of signalling signals in a communication switching system, storing correlations of particular ones of the program blocks with a particular protocol for signalling functions related to the process of a call to or from the communication switching system, enabling operation of the particular ones of the program blocks when a particular signalling signal is to be generated in the processing of a telephone call to or from the communication switching system, to match the particular protocol, whereby the communication switching system is enable to process calls restricted to the particular protocol out of the plurality of protocols for a particular call.

20 Claims, 4 Drawing Sheets

| R2 SIGNAL STATE ASSIGNMENT REMARKS: TYPE (INCOMING/OUTGOING): | | | | |
|---|---|---|---|---|
| SIGNAL RECEIVED | RESPONSE TO SIGNAL | | NEXT STATE | |
| | FIRST PROCEDURE | SECOND PROCEDURE | NO. | REMARKS |
| 1 2 3 4 5 6 7 8 9 10 11 12 13 14 15 | | | | ///////////// |

FIG. 4

```
                    R2 VARIANT ASSIGNMENT
OUTGOING REGISTER PARAMETERS
   Initial outgoing procedure: send_first_digit
   Initial outgoing state .. :      Remarks  : //////////
   Calling Party Category Signals (1-15)
      Coin collecting box. . . . :
      Data transmission . . . . . :
      Operator trunk . . . . . . :
      Ordinary subscriber . . . . :
      Subscriber with priority . :
      Test equipment . . . . . . :
   Exception Handling
      CLI not available (1-15) . :Next state : Remarks
                                              ://////////
      No more CLI digits (1-15) . :Next state : Remarks
                                              ://////////
      No more digits (1-15) . . . :
   Outgoing Tone-On Timeout (1-60 seconds) .. : 15
   Outgoing Tone-Off Timeout (1-60 seconds) . : 30
INCOMING REGISTER PARAMETERS
   Initial incoming state :         Remarks : //////////
   Digit Processing Request Signals (1-15)
      Send next digit . . . . . . :
      Send first digit . . . . . :
      Send last digit . . . . . . :
      Send last but 1 . . . . . . :
      Send last but 2 . . . . . . :
      Send last but 3 . . . . . . :
   Digit Processing Complete Handling
      Called party status transfer mechanism
         (CCITT, Immediate, None)  : CCITT
      Charge/setup speech (1-15)   :
      Congestion/no switch (1-15)  :
      Get caller category (1-15)   :Next state :Remarks
                                                ://////////
   Called Party Status Signals (1-15)
      Access violation . . . . . :
      Busy . . . . . . . . . . . :
      Congestion . . . . . . . . :
      DID trunk congestion . . . :
      DN in a parked state . . . :
      DN out of service . . . . . :
      Free, charge . . . . . . . :
      Free, no charge . . . . . . :
      Routed to intercept or RAD. :
      Unassigned number . . . . . :
      User-defined exception 1. . :
      User-defined exception 2. . :
      User-defined exception 3. . :
   Delay before starting pulsed signal
           (60-240 ms, 30 ms steps). : 150
   Pulsed signal duration (90-900 ms, 30 ms steps): 150
   Pulsed signal receiver reconnect delay
           (90-900 ms,30 ms steps) : 300
   Pulsed return signal for first/inter-signal
           timer expiry (1-15):
```

FIGURE 5

TELEPHONE OR DATA SWITCHING SYSTEM WITH VARIABLE PROTOCOL INTER-OFFICE COMMUNICATION

FIELD OF THE INVENTION

This invention relates to a telephone or data signal switching system and particularly to one which contains an adaptable protocol facility to provide different variants of an inter-office signalling protocol, such as R2 signalling, and to a method of providing the protocol.

BACKGROUND TO THE INVENTION

R2 signalling is a form of inter-switching office signalling which has been standardized by CCITT. This type of signalling uses dual tone multi-frequency (MF) signals, and is referred to as "compelled". In R2 signalling, an outgoing register of an originating switching office sends a first forward MF inter-register signal which is detected and recognized at a receiving office, which can be at the far end of a sequence of tandem switching offices. Upon recognizing the first forward inter-register signal, the receiving office sends a backward inter-register MF signal to the originating office, which has its own meaning and at the same time serves as an acknowledgment. This backward inter-register signal is detected and recognized at the originating office whereupon it sends the next forward inter-register signal to the receiving office. Again the receiving office sends a next backward inter-register signal to the originating office, and the back and forth communication continues until the last inter-register signal has been sent. The communication between switching offices is conducted between an outgoing register of the originating central office, via a trunk, to a similar incoming register at the receiving central office.

The system of communication is referred to as "compelled" because the originating switching office transmits signals in response to backward signals provided by the receiving switching office. The compelled nature of the protocol gives the R2 form of signalling significant flexibility. This includes not only the ability to transmit a variety of information, such as address signals, congestion signals, calling and called party status signals, etc., but also the ability to work end-to-end. End-to-end signalling is the ability to communicate directly with a far end incoming register, even if several intervening central offices have been used to route the call.

While the CCITT standard is usually used between international switching exchanges, numerous variants have been created for national use. Some of those variants have little in common with the CCITT R2 protocol except for the signalling frequencies used.

The fact that various variants of the standard have been implemented by various countries has resulted in local national switching offices that must be provided uniquely programmed to implement the local national protocol. Since most modern switching offices are program controlled, should changes be required to the switching office due to a change in national protocol or due to the switch being moved, etc., new switching office computer programs are required to be resident in the switching office. Typically, these programs are supplied on EPROM, floppy disk or magnetic tape and are supplied in each instance by the switching system supplier which is totally familiar with the programming requirements of its switching system product.

Changing or updating of a switching office due to a change in the inter-office communications protocol requires, however, significant programming effort on at least a country by country and switching system by switching system basis, which is costly to the customer and time consuming for the supplier.

In addition, with the expansion of world trade in switching systems, it is desirable for a switching system supplier to be able to provide a single switching system that can be easily adapted to provide and receive a large variety of inter-office signalling protocols or all variants of a standard signalling protocol at minimum cost. Until the present invention, this has not been achievable at a significantly low cost and with as much ease as is possible using the present invention.

SUMMARY OF THE INVENTION

In the present invention there is stored at each switching office a plurality of program procedures, referred to herein as program building blocks, for implementing different portions of a variety of signalling protocols for a signalling standard that is to be used, such as R2. In other words, small specialized control programs for controlling the signalling signal to be transmitted, which can be used to control the form of every different possible signal that is to be transmitted, are stored at the switching office. After installation of the switching office, the customer, by means of an user interface which is easy to use (e.g. by means of a form displayed on a terminal screen), selects the form of signal for each kind of signal to be transmitted using the local national protocol. The switching office personnel (or customer) thereby designate the corresponding program building blocks. The designating codes are downloaded to the control memories of the portions of the switching office that are to control the signalling protocol. Once downloaded and resident, the switching office uses corresponding building block control procedures designated by the designating codes in the control memories to control the form of the signalling into the designated protocol.

A similar function is provided for controlling the reception of, and interpretation of signals received from the distant office in the same protocol, from the trunk.

As a result the switching office manufacturer is no longer obliged to customize the switching system inter-office signalling for each national market. The customer himself designates the signalling signals required to implement the protocol, and the resulting corresponding program procedures which are already resident in the machine automatically modify the switching office to cause the signalling protocol to be implemented. This provides great flexibility and saves considerable time and money on the part of the customer upon initial installation of the switching system and with a requirement to change the signalling protocol.

The result is a more easy to install and implement-switching office which provides reduced cost to the customer, increased flexibility, a saving in manpower for the switching system supplier, and an universal switching office that can be sold for use in all markets which use variants of the same standard signalling protocol: in the case of CCITT R2 signalling, this includes most countries of the world.

One embodiment of the invention is a method of producing interoffice signalling comprising storing program building blocks (referred to also below as program blocks) for commanding generation, in a plurality of signalling protocols of signalling signals in a communication switching system, storing correlations of particular ones of the program blocks with a particular protocol for signalling functions related to the process of a call to or from the communication switching system, enabling operation of the particular ones of the program building blocks when a particular signalling signal is to be generated in the processing of a telephone call to or from the communication switching system, to match the particular protocol, whereby the communication switching system is enabled to process calls restricted to the particular protocol out of the plurality of protocols for a particular call.

Another embodiment of the invention is a communication switching system comprising signal generating apparatus for generating interoffice signalling signals, at least one trunk for transmitting the signalling signals, apparatus for connecting the signal generating apparatus to the trunk, apparatus for storing a plurality of program blocks for commanding generation of the signalling signals according to a plurality of protocols, apparatus for storing designations of particular ones of the program building blocks to command operation of the signal generating apparatus in accordance with a particular predetermined protocol, apparatus for enabling the particular ones of the program building blocks during the processing of a call to or from another switching office, whereby communication therewith in accordance with the particular predetermined protocol is mandated.

While reference to the invention being implemented on a switching office is made throughout this specification, it should be noted that the invention can be implemented on suitable PABXs, and therefore reference to switching offices (switching systems) throughout this specification should be construed to include such PABXs. The invention can be used equally in analog and digital systems, and in types used to transmit analog voice, digital (PCM) voice, or data signals.

BRIEF INTRODUCTION TO THE DRAWINGS

A better understanding of the invention will be obtained by reference to the detailed description below, with reference to the following drawings, in which.

DETAILED DESCRIPTION OF THE PREFERRED EMBODIMENT(S)

Figure 1:
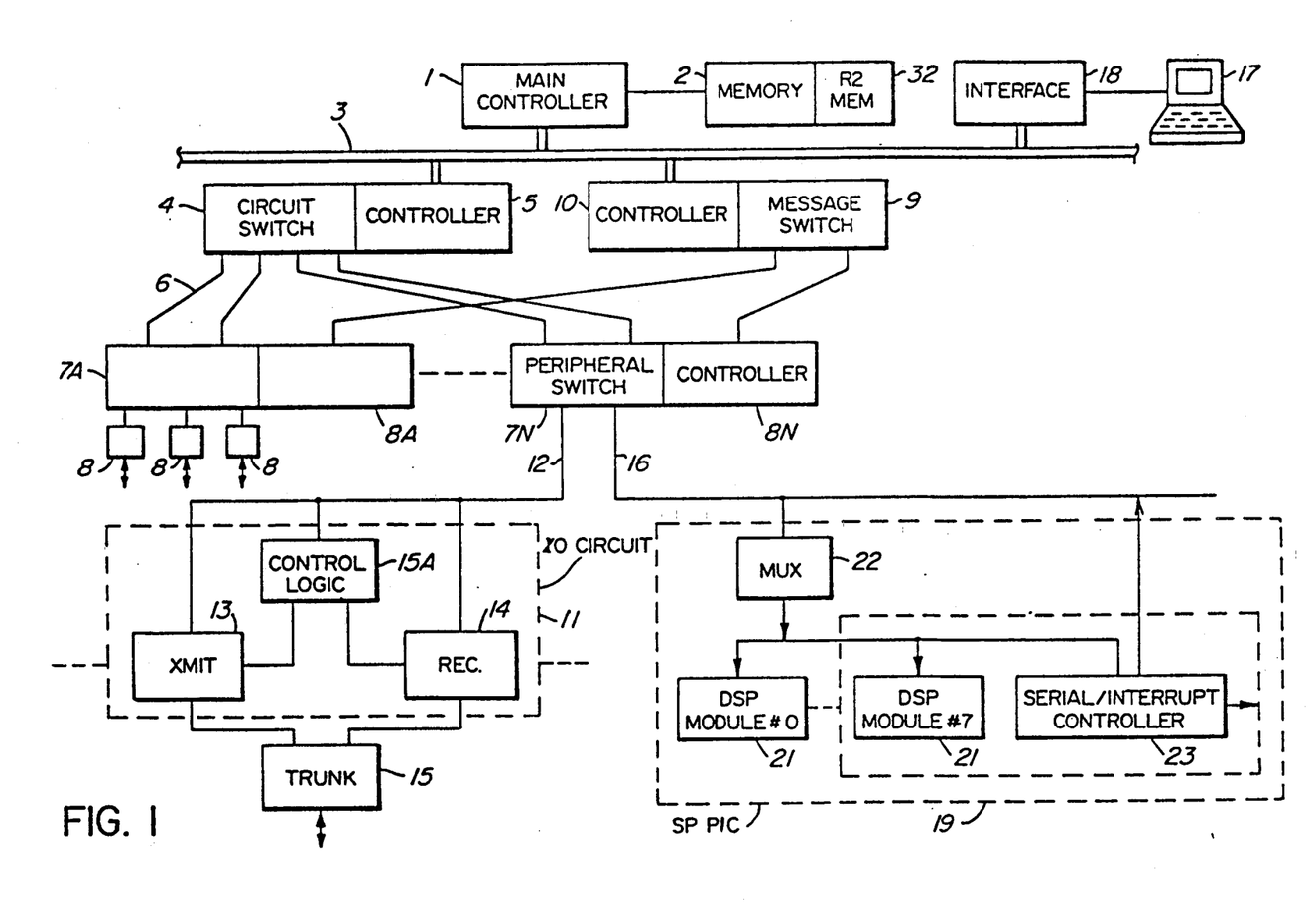
FIG. 1 is a block diagram of a switching system utilizing the present invention.

Refer now to FIG. 1, which illustrates a basic block diagram of a switching system such as one sold by Mitel Corporation under the trade mark GX5000 TM implementing the present invention.

The switching system is formed of a main controller 1 to which memory 2 is connected, and a main parallel bus 3 to which the main controller is connected. A circuit switch 4 controlled by a controller 5 which is connected to the bus 3, switches pulse code modulated (PCM) signals via lines 6 to inputs of peripheral switches 7A-7N, to which peripherals such as line circuits and trunk circuits 8 are connected. The controllers 1, 5 and 10 can be implemented in a single controller. Peripheral switches 7A-7N are controlled by peripheral controllers 8A-8N. Control signals from main controller 1 are switched to controllers 8A-8N by means of a message switch 9 which is controlled by controller 10, connected to bus 3 for receiving control messages from main controller 1. The switches are combination time and space division switches, as described in U.S. Pat. No. 4,510,597 issued Apr. 9, 1985 assigned to Mitel Corporation and entitled "TIME DIVISION SWITCHING MATRIX".

Programs to control operation of this system are stored in memory 2, and are accessed by main controller 1.

In order to effect R2 inter-office signalling, input-output (I/O) circuits such as circuit 11 are connected to peripheral switch 7N. Each I/O circuit 11 is connected to an I/O bus 12, which is connected to peripheral switch 7N. I/O circuit 11 is formed of a transmitter 13 and a receiver 14 for respectively transmitting and receiving signalling signals respectively to and from an inter-office trunk 15. The transmitter and receiver are controlled by control logic 15A.

Another I/O bus 16 is connected to peripheral switch 7N. Communications may be made between different peripherals via peripheral switch 7N, and via switch 7N, switch 4, switch 7A and between peripherals connected to the various peripheral switches 7A-7N. It should also be noted that message (control) signals may be applied to any peripheral from controllers 8A-8N due to their connection to peripheral switches 7A-7N internally. Thus, for example, a message may be transmitted from main controller 1 through bus 3, controller 10, message switch 9 to peripheral controller 8N. Controller 8N in response can control control logic 15A through switch 7N, for controlling either or both of transmitter 13 and receiver 14 connected to trunk 15.

A system similar to that described above is described in more detail in the following patents: U.S. Pat. No. 4,510,597 issued Apr. 9, 1985 entitled "Time Division Switching Matrix"; U.S. Pat. No. 4,615,028 issued Sep. 30, 1986 entitled "Switching System with Separate Supervisory Links" and U.S. Pat. No. 4,685,102 issued Aug. 4, 1987 entitled "Switching System Loopback Test Circuit". The content of the aforenoted three patents is incorporated herein by reference.

As this form of switching system is under stored program control, diagnostic and communication with the system by a technician is made via a computer terminal 17 which is connected to a bus interface 18 of conventional form, which itself is connected to the main parallel bus 3.

In accordance with the present invention a digital signal processor peripheral interface circuit (SP PIC) 19 is connected to bus 16. Each SP PIC occupies, in a successful prototype, one slot in a peripheral switch rack-mounted shelf, and contains eight signal processing modules 21, referenced DSP module #0–DSP module #7 in FIG. 1. Each DSP module is connected to the output of a multiplexer 22, which interfaces the I/O bus 16 and to a serial/interrupt controller 23. Controller 23 and the DSP modules can be connected together and combined with MUX 22 by connecting the DSP modules 21 and controller 23 to bus 16 via a switching matrix as described in the aforenoted patents.

Figure 2:
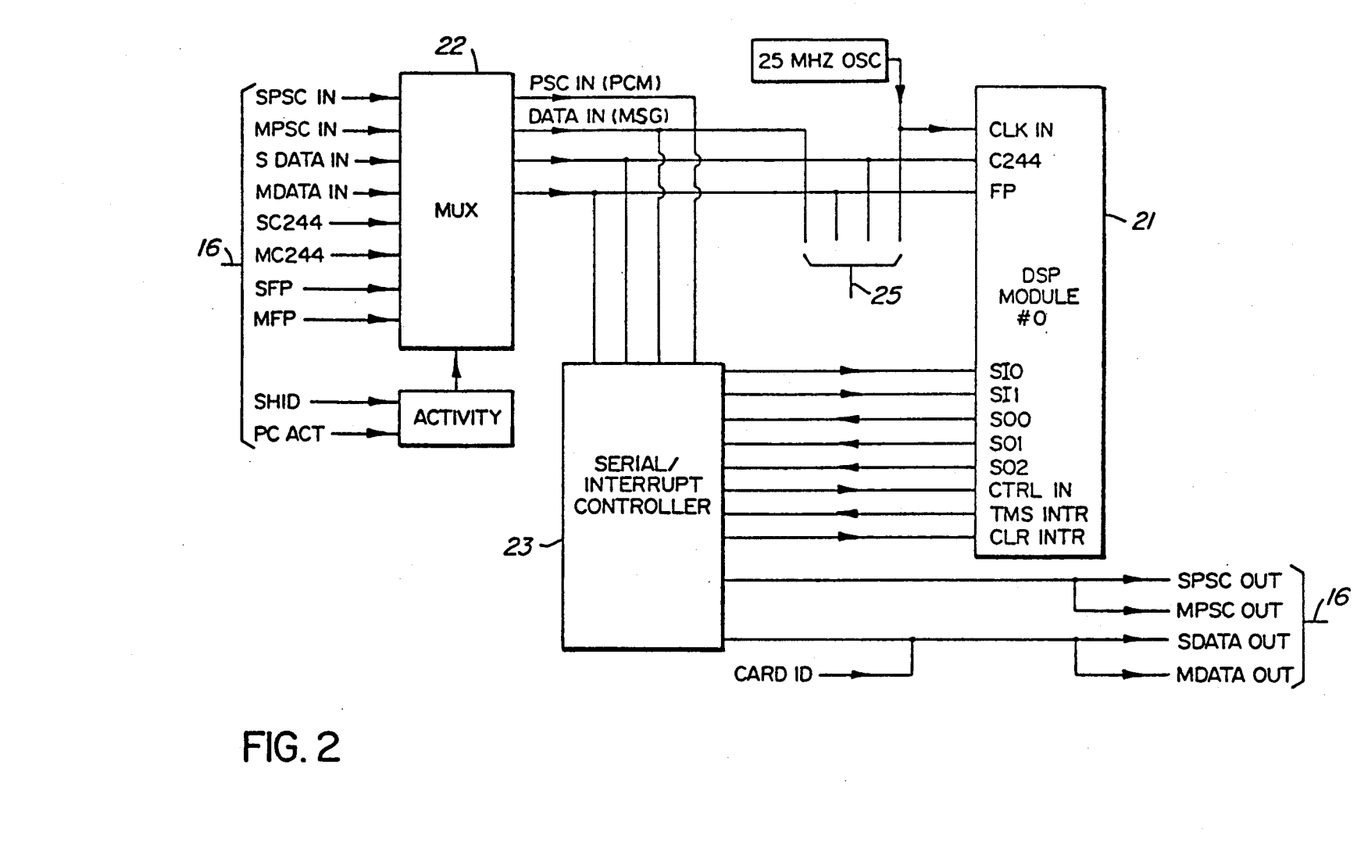
FIG. 2 is a block diagram of a signal processor peripheral interface circuit used as part of the invention.

FIG. 2 illustrates a more detailed block diagram of the signal processor PIC. The peripheral bus 16 is connected to the input of multiplexer 22. The output of multiplexer 22 is a serial PCM line PCS IN which is connected to the input of serial/interrupt controller 23. A serial message line DATA IN is connected from the output of multiplexer 22 to serial/interrupt controller 23. In addition clock and frame pulse signals are applied from the output of multiplexer 22 to the input of controller 23. The latter are also applied to corresponding inputs of illustrated DSP module #0, 21.

Serial input lines SI0 and SI1 are connected from controller 23 to corresponding inputs of DSP module 21, with control in CTRIN and clear interrupt CLRINTR lines. Output serial lines from DSP module 21 SO0, SO1 and SO2 are connected to controller 23, along with a TMSINTR line.

Output lines from controller 23 are serial SPSC OUT and MPSC OUT, and serial data lines SDTA OUT and MDTA OUT which are connected to bus 16, and thus to peripheral switch 7N. SPSC IN and SPSC OUT are the same plane PCM paths (i.e. they are connected to the peripheral controller/matrix residing in the same shelf). MPSC IN and MPSC OUT are connected to the mate plane controller. SDATA OUT and MDATA OUT carry message information via bus 16 to peripheral switch 7N.

The data in, C244, FP and clock lines are connected to data bus 25 (see FIG. 1). That bus is connected to another serial/interrupt controller associated with DSP module #1. In this manner, several DSP modules can be connected with an associated controller to the serial output of multiplexer 22.

Figure 3:
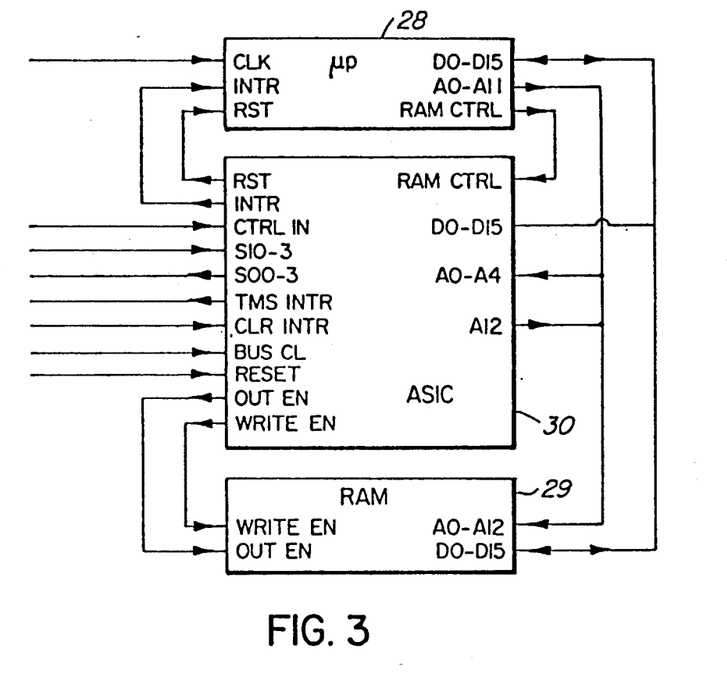
FIG. 3 is a block diagram of a digital signal processor module used in the signal processor of the invention.

FIG. 3 illustrates a preferred form of the DSP module. The module is controlled by a controller 28, which preferably is formed of a microprocessor such as Texas Instruments type TMS32010. Connected to the controller 28 is a random access memory RAM 29 having 16K bytes. An ASIC 30 is connected to RAM 29 and controller 28.

The structure of the ASIC should perform the following functions: It should allow the microprocessor 28 to be controlled via a serial bus link. It should support a host interface bound interrupt from the controller 28. It should provide an interface between the controller parallel bus and the serial bus. It should support a host interface controlled interrupt sequence for the controller 28. This interrupt sequence should be synchronized to the serial bus. It should contain a boot strap program required to download applications program code from the peripheral switch controller 8N into the memory 29. Finally, it should control the memory 29 page address bit.

The CTRLIN signal to the ASIC is a serial link signal. Each channel on the link should contain a command byte which is decoded and executed by the DSP module. The ASIC executes the command byte during the channel time which follows the channel on which the command byte is received.

The serial/interrupt controller 23 is implemented using an array of time division/space division switches, such as described in U.S. Pat. No. 4,510,597. Each of those devices provides a serial control for a pair of DSP modules.

The system in general operates as follows. Memories associated with controllers 8A-8N each contain all building block program procedures for implementing different portions of a variety of inter-office trunk protocols for each possible signal to be transmitted. Memory 2 is partitioned to contain in partitioned portion 32 a program of well known form which allows data input charts to be displayed on the screen of computer terminal 17, correlating received signals versus functions to be performed.

Each of the DSP modules contain a functionally simple non-customizeable program which transmits and receives the MF-R2 signals, the frequencies and levels of the tones thereof having been specified in the CCITT standard.

Figure 4:
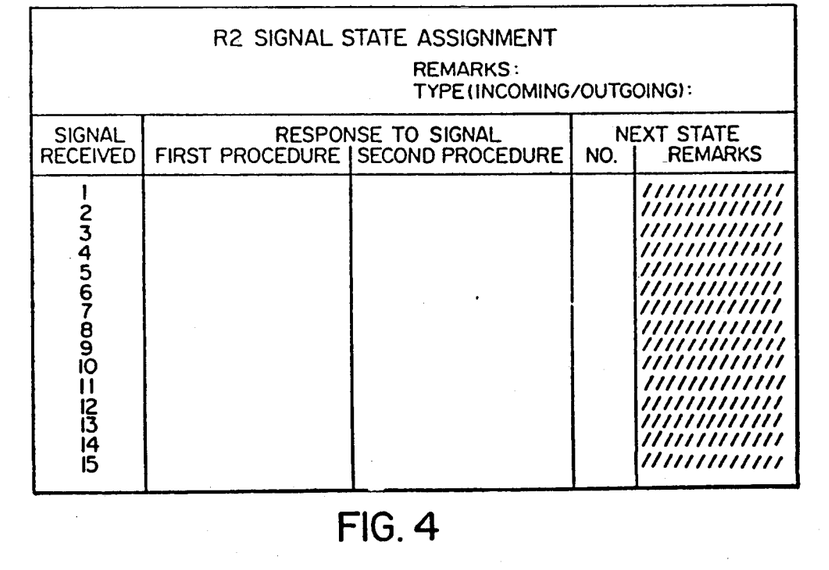
FIG. 4 is a first terminal screen form used in an embodiment of the invention.

After installation of the main switching system and loading of the DSP modules, the customer technician (operator) accesses main controller 1 by terminal 17 through interface 18 and bus 3, which brings from memory 32 a first chart on the screen of the terminal such as the one shown in FIG. 4.

The operator defines the various functional aspects using a predetermined set of user codewords for each signal. Once all the aspects have been defined, the main controller 1 downloads the user defined codewords to peripheral controller 8N designating the particular program building blocks to be used, for particular signals, where the correlation is stored. The user defined codewords are downloaded by controller 1 through controller 10 and message switch 9 to the peripheral switch controller 8N, where the full complement of program building blocks are stored, and resident in the control memories of peripheral switches 7A-7N. The selected building blocks then control the various switches and modules to control the form of the signals output on the various inter-office trunks, in accordance with the local variant of the R2 protocol.

In operation, controller 8N commands using the designated correlated command that e.g. DSP module 21 should transmit a signal, by writing into channels on the message link on bus 16 via peripheral switch 7N. A link is set up via switch 7N to a trunk 15. From bus 16, the command is routed along the SDATAIN or MDATAIN leads through MUX 22 and serial/interrupt controller 23 into the DSP module on lead SI0 where it is read by the DSP program which is running there. A resulting tone signal in PCM is generated which is passed via bus 16 through switch 7N to bus 12 and is transmitted via transmitter 13 to trunk 15.

Controller 8N is notified that a response tone has been detected or received, by the DSP module writing into channels on the SO0 lead which are via serial/interrupt controller 23 to the SDATAOUT and MDATAOUT leads on bus 16.

It should be noted that once the PCM connection is set up between the trunk 15 and a DSP module via a switch 7N, MF-R2 signalling takes place in-band. That is, the trunk control logic 15 does not interact with the R2 protocol. At this point, the trunk card is just carrying what it considers to be speech (MF-R2 signals) and so the transmitter 13 and receiver 14 just perform normal digital-to-analog and analog-to-digital conversions.

As an example, consider an outgoing trunk call using MF-R2 signalling. A seize message is sent from main controller 1, via message switch 9 to peripheral controller 8N requesting it to cause control logic 15 to seize trunk 15. Similarly, a seize message is sent from main controller 1 to peripheral controller 8N requesting it to schedule the R2 register control program which is resident in its memory. A PCM connection is set up from the DSP module 21 to the trunk's transmitter 13 via peripheral switch 7N, circuit switch 4 and peripheral switch 7N. Similarly a connection is set up via the same switching matrices between the trunk's receiver 14 and the DSP module 21.

The R2 register control program running on peripheral controller 8N now causes DSP module 21 to transmit the first forward signal as specified by the downloaded codewords. It does this by sending a message via bus 16 to DSP module 21 (as described above).

When a response signal is received from the far end trunk by DSP module 21, it notifies the R2 register control program resident at peripheral controller 8N by sending a message via bus 16. Upon receiving this message, the R2 register control program determines a signal to send in response using the downloaded codewords and the sequence described above is repeated.

This process continues until the protocol is completed. At this time, the PCM connections to the DSP module are broken and MF-R2 signalling is complete.

FIG. 4 illustrates a form that can be used on the terminal 17 as an aid for the customer technician to characterize the signalling for one category of signals used in the protocol. In the left-hand column are numbers of the fifteen different signals, put up on the terminal 17 screen by controller 1, and in the second and third columns, the action to be performed is entered by a technician using predefined terms. Successive ones of the data entry form are used for each category of signals in the protocol. This form is definable only at the installer level, i.e. the highest access authorization level.

In the second and third columns, up to two action responses can be entered. If both are specified, the first is executed before the second. Of course the two procedures cannot be the same. The system action responses can be selected from building block procedures described below.

At the top of the form, it is entered whether the form is being used for incoming or outgoing signals.

In the list of program building blocks listed below, each action is defined by a first word forming the language, followed by the function to be implemented by the system in response.

| | Procedures which can be executed in the context of an outgoing R2 register are listed below. If the procedure might be executed in response to a standard CCITT signal, that signal is listed beside the procedure. |
|---|---|
| CCITT Standard | Name of Procedure/ Description |
| | Outgoing State Building Blocks |
| — | connect Release the FM-R2 transceiver and connect the speech path. Set up the appropriate charging mechanism if required. |
| A-4,15 | excep_congestion |
| B-4 | Set the R2 exception to congestion. |
| B-8 | excep_dn_out_of_serv Set the R2 exception to DN out of service. |
| — | excep_invalid_signal Set the R2 exception to invalid signal. |
| — | excep_none Set the R2 exception to none (default). |
| B-3 | excep_sub_busy Set the R2 exception to busy. |
| B-5 | excep_unassigned_num Set the R2 exception to unassigned number. |
| — | excep_user_1 Set the R2 exception to user-defined exception number 1. |
| — | excep_user_2 Set the R2 exception to user-defined exception number 2. |
| — | excep_user_3 |

-continued

| | Procedures which can be executed in the context of an outgoing R2 register are listed below. If the procedure might be executed in response to a standard CCITT signal, that signal is listed beside the procedure. |
|---|---|
| CCITT Standard | Name of Procedure/ Description |
| | Set the R2 exception to user-defined exception number 3. |
| — | reroute Terminate the current call and attempt alternative rerouting. |
| — | reset_CLI_index Set the next CLI digit index to the beginning of the CLI number. |
| — | reset_digit_index Set the next digit index to the beginning of the number. |
| A-3 | send_category |
| A-5 | Send category of calling party. This procedure sends the category programmed in the class of service, using the mapping given in the R2 Variant Assignment. |
| — | send_first_CLI_digit Send the first calling line identification digit. If no CLI is available, the exception handling specified in the R2 Variant Assignment is used. |
| — | send_first_digit Restart. |
| A-2 | send_last_but_1 Send digit (n-1). |
| A-7 | send_last_but_2 Send digit (n-2). |
| A-8 | send_last_but_3 Send digit (n-3). |
| — | send_last_digit Repeat last digit sent (n). |
| — | send_next_CLI_digit Send the next CLI digit. If no more CLI digits are available, the exception handling specified in the R2 Variant Assignment is used. |
| A-1 | send_next_digit Send digit (n + 1). |
| — | set_called_control Mark the call as being under called party control. |
| — | set_calling_control Mark the call as being under calling party control. |
| A-6 | set-chargeable |
| B-6 | Mark that the call is chargeable. This is the default condition for every new call. |
| — | set_first_control Mark the call as being under first party control. |
| — | set_joint_control Mark the call as being under joint party control. |
| B-7 | set_not_chargeable Mark that the call is not chargeable. |
| — | terminate Release the MF-R2 transceiver and terminate the current call with exception handling specified by the current R2 exception. |
| — | send_1, send_2, send_3, send_4, send_5, send_6, send _7, send_8, send_9, send_10, send_11, send_12, send_13, send_14, send_15 Send the nth forward signal. |
| | Incoming State Building Blocks |
| — | category_ccb Mark the caller as a coin collecting box. |
| II-6 | category_data Mark the caller as a data transmission. |
| II-5 | category_operator Mark the caller as an operator. |
| II-1 | category_ordinary Mark the caller as an ordinary subscriber. |
| II-2 | category_priority Mark the caller as a subscriber with |

-continued

| CCITT Standard | Name of Procedure/ Description |
|---|---|
| | Procedures which can be executed in the context of an outgoing R2 register are listed below. If the procedure might be executed in response to a standard CCITT signal, that signal is listed beside the procedure. |
| | priority. |
| II-3 | category__test Mark the caller as test equipment. |
| — | excep__invalid__signal |
| — | excep__none See outgoing state building blocks. |
| I-10 | process__digit__0 |
| I-1 | process__digit__1 |
| I-2 | process__digit__2 |
| I-3 | process__digit__3 |
| I-4 | process__digit__4 |
| I-5 | process__digit__5 |
| I-6 | process__digit__6 |
| I-7 | process__digit__7 |
| I-8 | process__digit__8 |
| I-9 | process__digit__9 |
| I-15 | process__digit__timeout Use the specified digit, the digit tree and the information in the R2 Variant Assignment to attempt to route the call. |
| — | send__status__and__end Send the called party status. When the signalling cycle is complete, either clear down the call or connect the speech path. |
| — | terminate See outgoing state building blocks. |
| — | send__1, send__2, send__3, send__4, send__5, send__6, send __7, send__8, send__9, send__10, send__11, send__12, send__13, send__14, send__15 Send the nth backward signal. |

It should be noted that the particular procedures specified are all procedures that are normally implemented in a switching office. Consequently the particular program listings are not given herein, as they will be different for each form of switching office and are known to persons skilled in the art.

Figure 5:
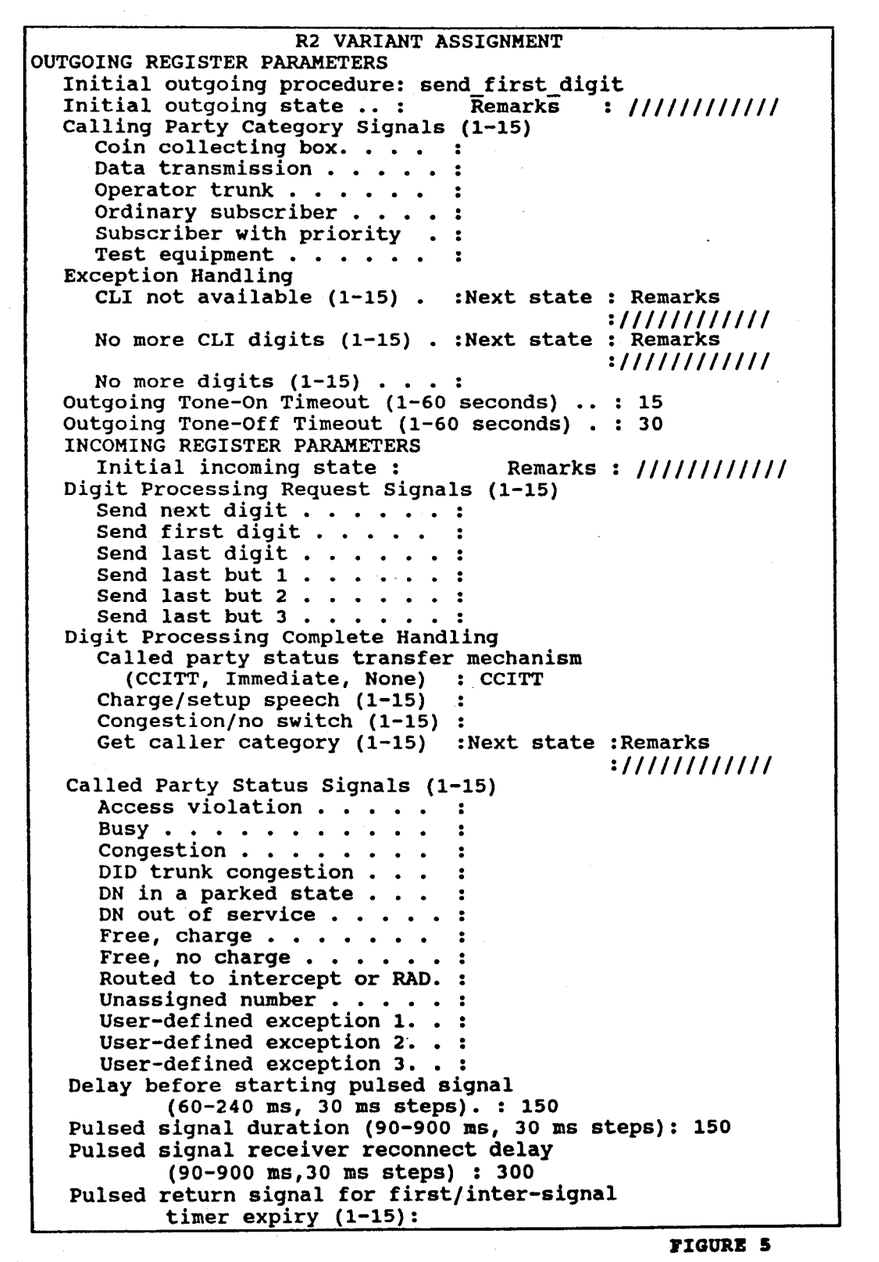
FIG. 5 is a second terminal screen form used in an embodiment of the invention.

A representative second form which is preferred to be used to define variants, that is, to specify the initial procedures and conditions and time outs, as well as parameters for the program building block procedures, such as the mapping of logical conditions to physical signals, is shown in FIG. 5.

A list and description of each of the fields to be identified follows:

FIELD DESCRIPTIONS

1. Initial Outgoing Procedure

The initial outgoing procedure is the R2 building block procedure which should be executed when outgoing R2 signalling is initiated. This procedure is generally send__first__digit, but in some cases the explicit signal procedures (send1, send2 etc.) may also be useful.

2. Initial Outgoing State

The initial outgoing state is the state to enter after executing the initial outgoing procedure. The register stays in this state until it either receives a backward signal from the incoming register or the forward tone timeout period expires. When this form is committed, the remark programmed against the requested state is displayed in a protected field.

3. Calling Party Category

The data in this section are used to map the calling party category (as defined in the class of service) to a physical R2 signal to transmit when the calling party category is requested.

4. Exception Handling

The signals in this section are used to respond to backward signalled requests which the outgoing R2 register cannot comply with.

(a) CLI not available

This defines the signal to return if a request for calling line identification digits has been received, but none are available (for example, on a tandem call when the incoming link does not transmit the calling party's number). If no signal is specified, none is returned. If no next state is specified, execution continues in the same state.

When this form is committed, the remark programmed against the requested state is displayed in a protected field.

This exception handling is invoked by the send__first__CLI__digit procedure.

(b) No more CLI digits

This defines the signal to return if a request for more CLI digits (not including the first) has been received, but none are available. If no signal is specified, none is returned. If no next state is specified, execution continues in the same state.

When this form is committed, the remark programmed against the requested state is displayed in a protected field.

This exception handling is invoked by the send__next__CLI__digit procedure.

(c) No more digits

This defines the signal to return if a request for more digits (not including CLI digits) has been received, but none are available. If no signal is specified, none is returned. If no next state is specified, execution continues in the same state.

When this form is committed, the remark programmed against the requested state is displayed in a protected field.

This handling is invoked by the send__next__digit procedure when call processing determines that the entire called number has been entered and the terminating register requests another digit. The entire called number is considered entered when critical timing has been completed or the last digit in the digits to follow programmed against the route has been received.

5. Forward Tone Timeout

The forward tone timeout is the maximum period for which the outgoing register will continue to transmit a forward signal in the absence of an acknowledging backward signal. It is also the maximum period for which the outgoing register will wait for a pulsed backward signal when no forward signal is being sent. If this timeout occurs, the call will be terminated. CCITT Q.476 recommends a period of 15±3 seconds.

6. No-tone Timeout

The no-tone timeout is the maximum period for which the outgoing register will wait for a backward signal to be removed after the time that the forward signal is removed. If this timeout occurs, the call will be terminated.

7. Initial Incoming State

The initial incoming state is the state which the incoming register enters when it is first seized. When this form is committed, the remark programmed against the requested state is displayed in a protected field.

8. Called Part Status Signals

The data in this section are used by the incoming register to map the called party status (as determined by call processing to a physical R2 signal to send when the called party status is to be transmitted. More than one status may be mapped to the same physical signal. For example, if special information tone is available, access violations might be mapped to the signal to request it. If it is not available, access violations might be mapped to the same signal as directory number out of service.

9. Digit Processing Action Table

This table maps the digit processing actions which might be required to route a call to the physical R2 signals to transmit in order to request these actions. For example, fi the digit tree indicates that another digit is required, the 'Send next digit' signal is sent.

If no signal is programmed against an action, call processing will use the rules specified in Section 2.1 under Digit Processing Action Table.

At least one of the two 'address done' conditions must be programmed. When this form is committed with a next state programmed for the 'address complete, get category' field, the remark programmed against that state is displayed in a protected field.

10. Delay Before Starting Pulsed Signal

This delay is inserted between the end of transmission of the last signal of the compelled cycle and the start of transmission of the pulsed signal. It must be specified in increments of 30 ms. CCITT Q.442 recommends a minimum delay of 100 ms.

11. Pulsed Signal Duration

This field specifies the duration of signals sent as pulsed signals. It must be specified in increments of 30 ms. CCITT Q.442 recommends a pulsed signal duration of 150 ms.

12. Pulsed Signal Receiver Reconnect Delay

This field specifies the time, after the completion of the pulsed backward signal, before the incoming receiver can be reconnected. It is ignored in cases where the R2 register signalling is terminated after sending the pulsed signal. This delay must be specified in increments of 30 ms. CCITT Q.442 recommends a delay of 300±100 ms.

13. Pulsed Return Signal for First/Inter-digit Timer Expiry

If the first digit or interdigit timers, as programmed on a trunk's class of service, expire, this field defines the signal which should be returned, in pulsed form, before the call is terminated. If no signal is specified, none is sent.

The following illustrate filled in action identifying forms for six separate signalling conditions, in which the first represents a state of sending outgoing digits, the second of sending outgoing CLI, the third of handling the receipt of the called party status after confirmation the outgoing category has been sent, the fourth of receiving incoming digits, the fifth of terminating signalling after sending signal BJ, and the sixth of handling the receipt of the calling party category and terminating signalling after sending the called party status. The assignment noted has been created to cause performance of the R2 signalling variations of Kenya, for a switching system manufactured by Mitel Corporation designated by the trade mark GX5000. The various signal functions identified above are noted in the headnote of each form. The procedures listed correspond to the building block functions described earlier in this disclosure.

| Signal Received | R2 Signal State Assignment | | | |
|---|---|---|---|---|
| | Response to Signal | | Next State | |
| | First procedure | Second procedure | No. | Remarks |
| R2 Variant: 1 | R2 State: 1 | Remarks: A_Send_Dgts | | |
| Type (Incoming/Outgoing): Outgoing | | | | |
| ////1/// | send_next_digit | | | ///////////// |
| ////2/// | send_last_but_1 | | | ///////////// |
| ////3/// | send_category | | 3 | /B_Sent_Catgy |
| ////4/// | excep_congestion | reroute | | ///////////// |
| ////5/// | send_category | reset_CLI_index | 2 | /A_Send_CLI// |
| ////6/// | set_chargeable | connect | | ///////////// |
| ////7/// | send_last_but_2 | | | ///////////// |
| ////8/// | send_last_but_3 | | | ///////////// |
| ////9/// | send_first_digit | | | ///////////// |
| ///10/// | set_chargeable | connect | | ///////////// |
| ///11/// | set_chargeable | connect | | ///////////// |
| ///12/// | set_chargeable | connect | | ///////////// |
| ///13/// | set_chargeable | connect | | ///////////// |
| ///14/// | set_chargeable | connect | | ///////////// |
| ///15/// | set_chargeable | connect | | ///////////// |
| R2 Variant: 1 | R2 State: 2 | Remarks: A_Send_CLI | | |
| Type (Incoming/Outgoing): Outgoing | | | | |
| ////1/// | excep_unassigned_num | terminate | | ///////////// |
| ////2/// | excep_unassigned_num | terminate | | ///////////// |
| ////3/// | excep_unassigned_num | terminate | | ///////////// |
| ////4/// | excep_congestion | reroute | | ///////////// |
| ////5/// | send_next_CLI_digit | | | ///////////// |
| ////6/// | excep_unassigned_num | terminate | | ///////////// |
| ////7/// | excep_unassigned_num | terminate | | ///////////// |
| ////8/// | excep_unassigned_num | terminate | | ///////////// |
| ////9/// | excep_unassigned_num | terminate | | ///////////// |
| ///10/// | excep_unassigned_num | terminate | | ///////////// |
| ///11/// | excep_unassigned_num | terminate | | ///////////// |

-continued

R2 Signal State Assignment

| Signal Received | Response to Signal | | Next State | |
|---|---|---|---|---|
| | First procedure | Second procedure | No. | Remarks |
| ///12/// | excep_unassigned_num | terminate | | //////////// |
| ///13/// | excep_unassigned_num | terminate | | //////////// |
| ///14/// | excep_unassigned_num | terminate | | //////////// |
| ///15/// | excep_unassigned_num | terminate | | //////////// |

R2 Variant: 1   R2 State: 3   Remarks: B_Sent_Catgy
Type (Incoming/Outgoing): Outgoing

| | | | | |
|---|---|---|---|---|
| ////1/// | excep_unassigned_num | terminate | | //////////// |
| ////2/// | excep_unassigned_num | terminate | | //////////// |
| ////3/// | excep_sub_busy | terminate | | //////////// |
| ////4/// | excep_congestion | reroute | | //////////// |
| ////5/// | excep_unassigned_num | terminate | | //////////// |
| ////6/// | set_chargeable | connect | | //////////// |
| ////7/// | excep_unassigned_num | terminate | | //////////// |
| ////8/// | excep_unassigned_num | terminate | | //////////// |
| ////9/// | excep_unassigned_num | terminate | | //////////// |
| ///10/// | excep_unassigned_num | terminate | | //////////// |
| ///11/// | excep_unassigned_num | terminate | | //////////// |
| ///12/// | excep_unassigned_num | terminate | | //////////// |
| ///13/// | excep_unassigned_num | terminate | | //////////// |
| ///14/// | excep_unassigned_num | terminate | | //////////// |
| ///15/// | excep_unassigned_num | terminate | | //////////// |

R2 Variant: 1   R2 State: 4   Remarks: I_Rcv_Digits
Type (Incoming/Outgoing): Incoming

| | | | | |
|---|---|---|---|---|
| ////1/// | process_digit | | | //////////// |
| ////2/// | process_digit | | | //////////// |
| ////3/// | process_digit | | | //////////// |
| ////4/// | process_digit | | | //////////// |
| ////5/// | process_digit | | | //////////// |
| ////6/// | process_digit | | | //////////// |
| ////7/// | process_digit | | | //////////// |
| ////8/// | process_digit | | | //////////// |
| ////9/// | process_digit | | | //////////// |
| ///10/// | process_digit | | | //////////// |
| ///11/// | send3 | | 5 | /B5_Next///// |
| ///12/// | send3 | | 5 | /B5_Next///// |
| ///13/// | send3 | | 5 | /B5_Next///// |
| ///14/// | send3 | | 5 | /B5_Next///// |
| ///15/// | send3 | | 5 | /B5_Next///// |

R2 Variant: 1   R2 State: 5   Remarks: B5_Next
Type (Incoming/Outgoing): Incoming

| | | | | |
|---|---|---|---|---|
| ////1/// | send5 | terminate | | //////////// |
| ////2/// | send5 | terminate | | //////////// |
| ////3/// | send5 | terminate | | //////////// |
| ////4/// | send5 | terminate | | //////////// |
| ////5/// | send5 | terminate | | //////////// |
| ////6/// | send5 | terminate | | //////////// |
| ////7/// | send5 | terminate | | //////////// |
| ////8/// | send5 | terminate | | //////////// |
| ////9/// | send5 | terminate | | //////////// |
| ///10/// | send5 | terminate | | //////////// |
| ///11/// | send5 | terminate | | //////////// |
| ///12/// | send5 | terminate | | //////////// |
| ///13/// | send5 | terminate | | //////////// |
| ///14/// | send5 | terminate | | //////////// |
| ///15/// | send5 | terminate | | //////////// |

R2 Variant: 1   R2 State: 6   Remarks: II_Catgy_Nxt
Type (Incoming/Outgoing): Incoming

| | | | | |
|---|---|---|---|---|
| ////1/// | category_ordinary | connect_reply_status | | //////////// |
| ////2/// | category_ordinary | connect_reply_status | | //////////// |
| ////3/// | category_ordinary | connect_reply_status | | //////////// |
| ////4/// | category_ordinary | connect_reply_status | | //////////// |
| ////5/// | category_ordinary | connect_reply_status | | //////////// |
| ////6/// | category_ordinary | connect_reply_status | | //////////// |
| ////7/// | category_ordinary | connect_reply_status | | //////////// |
| ////8/// | category_ordinary | connect_reply_status | | //////////// |
| ////9/// | category_ordinary | connect_reply_status | | //////////// |
| ///10/// | category_ordinary | connect_reply_status | | //////////// |
| ///11/// | category_ordinary | connect_reply_status | | //////////// |
| ///12/// | category_ordinary | connect_reply_status | | //////////// |
| ///13/// | category_ordinary | connect_reply_status | | //////////// |
| ///14/// | category_ordinary | connect_reply_status | | //////////// |
| ///15/// | category_ordinary | connect_reply_status | | //////////// |

The associated variant assignment is shown below.

| R2 VARIANT ASSIGNMENT | | |
|---|---|---|
| R2 Variant: 1 | | |

OUTGOING REGISTER PARAMETERS

Initial outgoing procedure: send_first_digit
Initial outgoing state: 1    Remarks: A_Send_Dgts/
Calling Party Category Signals (1-15)

Coin collecting box: 1
Data transmission: 1
Operator trunk: 1
Ordinary subscriber: 1
Subscriber with priority: 1
Test equipment: 1
Exception Handling

| | | |
|---|---|---|
| CLI not available (1-15): 15 | Next state: 1 | Remarks: A_Send_Dgts/ |
| No more CLI digits (1-15): 15 | Next state: 1 | Remarks: A_Send_Dgts/ |
| No more digits (1-15): | Next state: | Remarks: /////////// |

Outgoing Tone-On Timeout (1-60 seconds): 15
Outgoing Tone-Off Timeout (1-60 seconds): 30

INCOMING REGISTER PARAMETERS

Initial incoming state: 4    Remarks: I_Rcv_Digits
Digit Processing Request Signals (1-15)

Send next digit: 1
Send first digit: 9
Send last digit:
Send last but 1: 2
Send last but 2: 7
Send last but 3: 8
Digit Processing Complete Handling Called party status transfer mechanism
(CCITT, Immediate, None): CCITT
Charge/setup speech (1-15): 6
Congestion/no switch (1-15): 4

| | | |
|---|---|---|
| Get caller category (1-15): 3 | Next state: 6 | Remarks: II_Catgy_Nxt |

Called Party Status Signals (1-15)

Access violation: 5
Busy: 3
Congestion: 4
DID trunk congestion: 3
DN in a parked state: 3
DN out of service: 5
Free, charge: 6
Free, no charge: 6
Routed to intercept or RAD: 6
Unassigned number: 5
User-defined exception 1: 4
User-defined exception 2: 4
User-defined exception 3: 4
Delay before starting pulsed signal (60-240 ms, 30 ms steps): 150
Pulsed signal duration (90-900 ms, 30 ms steps): 150
Pulsed signal receiver reconnect delay (90-900 ms, 30 ms steps): 300
Pulsed return signal for first/inter-signal timer expiry (1-15): 4

---

It may thus be seen that with the embodiment described above the customer can cause the switching office to identify the building block programs from the large number of available programs stored in the peripheral controller memories. The result is that controlling programs selected out of a large number of available programs cause the system to self configure so as to process inter-office signalling according to the particular local variant. This is done without requiring special attention by the system manufacturer, and can be changed at will by the customer to accommodate a change in location of the switching office, to update the protocol and upon installation.

While the embodiments described refer to R2 signalling, the principles of this invention are not limited for use with R2 signalling, or indeed to inter-office signalling, and may be applied for self-configuration of the switching system in order to adapt it to any other local conditions desired.

A person skilled in the art understanding the present invention may now conceive of variations or other embodiments using the concepts described herein. All are considered to be within the sphere and scope of the invention as defined in the claims appended hereto.

We claim:

1. A method of producing interoffice signalling comprising:
    (a) storing program building blocks for commanding generation, in a plurality of signalling protocols, of signalling signals in a communication switching system,
    (b) storing correlations of particular ones of said program building blocks with a particular protocol for signalling functions related to the process of a call to or from said communication switching system,
    (c) enabling operation of said particular ones of said program building blocks when a particular signalling signal is to be generated in the processing of a telephone call to or from the communication switching system, to match said particular protocol, whereby the communication switching system is enabled to process calls restricted to said particular protocol out of said plurality of protocols for a particular call.

2. A method as defined in claim 1, including generating the signalling signals in a universal signalling generator which is adapted to receive commands from the program building blocks and to generate signalling signals in response thereto.

3. A method as defined in claim 2, including connecting the universal signalling generator to a trunk through a switch, and transmitting the signalling signals to the trunk via the switch for transmission to a remote communication switching office.

4. A method as defined in claim 3, including transmitting the signalling signals in a voiceband to the remote telephone switching office.

5. A method of interoffice signalling of a communication switching system comprising:
(a) storing program building blocks for commanding operation, in a plurality of signalling protocols, of a signalling signal generator and signalling signal receiver;
(b) storing designation of particular ones of said program building blocks which relate to a particular signalling protocol to be used by said system,
(c) enabling operation of only said particular ones of said program building blocks during the processing of a call to or from said system, to command the signal generator to generate particular signals to be generated or to detect the receipt of particular signals received by said receiver,
whereby the communication switching system is enabled to process calls restricted to said particular protocol out of said plurality of protocols.

6. A method as defined in claim 5, including the steps of displaying a chart of signalling functions, receiving command data from an operator relating to particular signalling operations to be used by the system corresponding to said functions, and processing the command data to form said program building blocks designations.

7. A method as defined in claim 6 including providing a signal generator and signal receiver which can respectively transmit and receive signalling signals in forms corresponding to all said plurality of signalling signals, the signalling generator operating in response to said command data to generate signals only in accordance with said particular protocol.

8. A method as defined in claim 7 including connecting the signal generator and signal receiver to a trunk for transmitting and receiving signals via said trunk.

9. A method as defined in claim 8 in which the signalling signals are transmitted and received in voiceband via said trunk.

10. A method as defined in claim 9 in which said signals are pulse code modulated.

11. A communication switching system comprising:
(a) signal generating means for generating interoffice signalling signals,
(b) at least one trunk for transmitting the signalling signals,
(c) means for connecting the signal generating means to the trunk,
(d) means for storing a plurality of program building blocks for commanding generation of the signalling signals according to a plurality of protocols,
(e) means for storing designations of particular ones of the program building blocks to command operation of the signal generating means in accordance with a particular predetermined protocol,
(f) means for enabling said particular ones of the program building blocks during the processing of a call to or from another switching office,
whereby communication therewith in accordance with said particular predetermined protocol is mandated.

12. A system as defined in claim 11, in which the means for storing said program building blocks and means for storing said designations is a peripheral processor memory adapted to transmit said particular ones of the program building blocks to the signal generating means.

13. A system as defined in claim 12, in which the means for connecting the signal generating means to the trunk is a switch controlled by the peripheral processor.

14. A system as defined in claim 11 in which the signal generating means is comprised of a controller for receiving said particular ones of the program building blocks and a signal generator controlled by the controller for generating said signals.

15. A system as defined in claim 14 in which said signal generating means includes a receiver for receiving signals from said another switching office, controlled by the controller.

16. A system as defined in claim 15 in which the means for connecting the generating means to the trunk is a time and/or space division switching matrix.

17. A system as defined in claim 16, in which the means for storing said program building blocks and means for storing said designations is a peripheral processor memory adapted to transmit said particular ones of the program building blocks to the signal generating means.

18. A system as defined in claim 17 in which the switching matrix is controlled by the peripheral processor.

19. A system as defined in one of claims 11-14 including a system processor for controlling operation of said system and for generating a display, means for receiving data relating to signalling functions for predetermining said protocol in response to said display, means for generating said designations of particular ones of the program building blocks, and for providing said designations to said means for storing said designations.

20. A system as defined in one of claims 11-14 including an operator input-output console, a system processor controlling operation of said system and console, means for generating a display on said console relating to signalling functions, means for receiving data input on the console relating to particular signals for predetermining said protocol in response to said display, the system processor including means for generating designations of particular ones of the program building blocks corresponding to said data, and for providing said designations to said means for storing said designations.

* * * * *